Nov. 15, 1966     W. H. McGILL     3,285,727
METHOD OF THERMOMETER BULB FABRICATION
Filed April 22, 1963
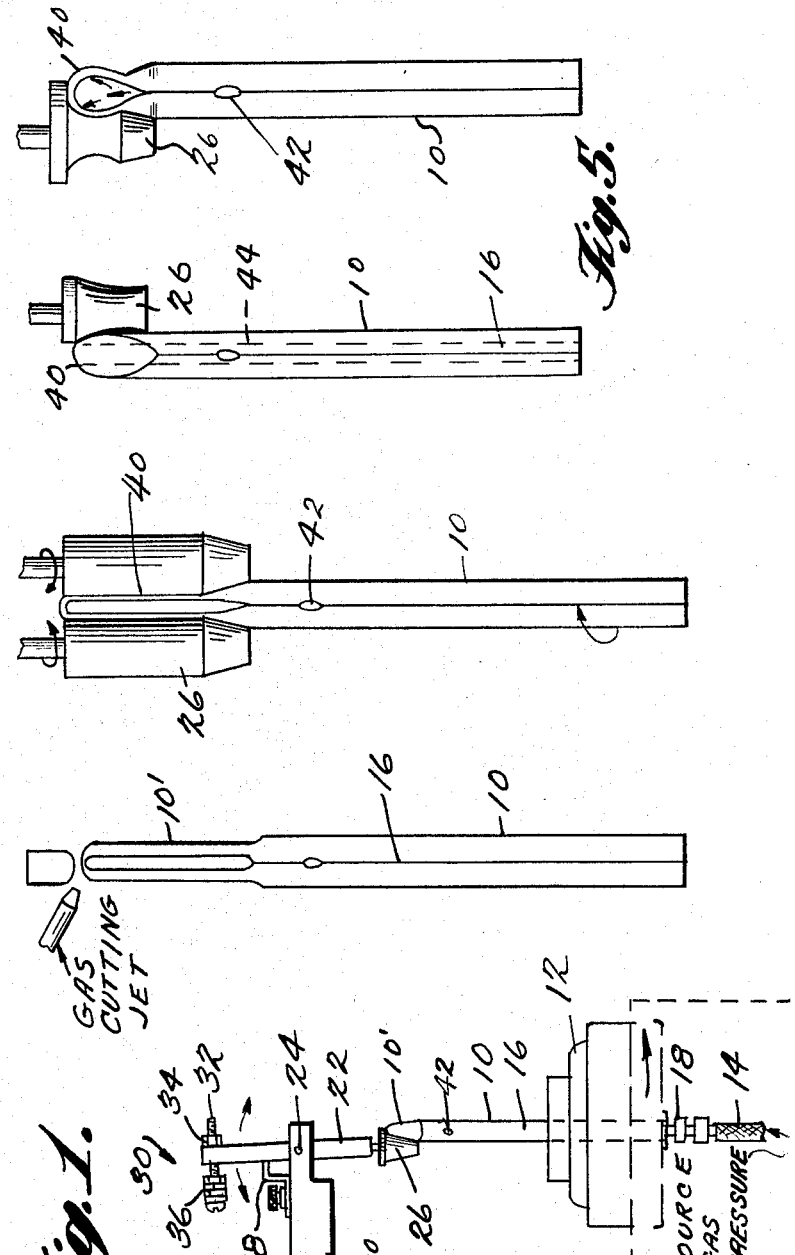
INVENTOR
WILLIAM H. McGILL
BY Cushman, Darby & Cushman
ATTORNEYS

United States Patent Office 3,285,727
Patented Nov. 15, 1966

3,285,727
METHOD OF THERMOMETER BULB FABRICATION
William H. McGill, 905 9th Ave. N., Nashville, Tenn.
Filed Apr. 22, 1963, Ser. No. 274,762
7 Claims. (Cl. 65—109)

This invention relates to the fabrication of thermometers. More particularly, this invention relates to the fabrication of thermometers having bulbs formed integrally therewith.

Thermometers as generally manufactured and sold contain a temperature responsive and indicating liquid. The liquid is contained in an inner passageway or bore of very small diameter. Rises and falls of the liquid in the bore, which is often of capillary size, are used to indicate temperature. A bulb is connected to the passageway at one end to hold additional liquid, the bulb holding many times the quantity of liquid contained in the passageway. Hence, small variations in size of the bulb multiply many times the effect on temperature indications.

In the fabrication of clinical thermometers, it has been the practice to use one type of glass for the thermometer stem and another type of glass for the bilb. The stem glass is usually provided with a front portion which magnifies the hairlike column of liquid, and a white or colored backing formed in the glass which acts as a reflecting face opposite the magnifying front to aid in reading the column. The bulb glass usually contains neither the magnifying portion nor the reflecting face. In the past, bulb glass has been welded to the stem glass and a bulb then blown to its desired size. Alternatively, the bulb may be first blown and then welded to the stem glass. In clinical thermometers, the indicating liquid is usually mercury and the thermometers are so formed as to be self-registering.

Usually, clinical thermometers are provided with a self-registering feature; i.e., once a particular temperature is reached, the mercury is prevented from retreating in the bore in response to a drop in temperature. It is therefore customary to physically "shake down" the mercury after a reading has been taken. This self-registration is accomplished by forming an irregularly shaped constriction in the bore. An enlargement called a cavity or blister is first blown in the bore. One side of the cavity is heated and then, in conjunction with reduced pressure, is allowed to shrink to an almost closed position adjacent the source of heat. As a result of this procedure there is produced the constriction having a double canal around the cavity. Also, an inclosed plane is developed by the contraction which aids in preventing the mercury from retreating down the bore.

It has been proposed in the formation of many types of thermometers to fabricate the liquid-holding bulb integrally with the stem portion. The methods heretofore used have required considerable individual skill, and human error has resulted in irregularity in sizes and shapes of the bulbs. In the formation of clinical thermometers particularly, size and shape of the bulbs is of considerable importance.

It has been proposed to minimize dependence upon human skill and the resultant irregularities through the use of molds which aid in forming the bulb portions of thermometers. This method, however, leaves a disfiguration in the bulb and it has been found there is a tendency for the glass to strain and crack during continued use.

It is therefore an object of this invention to provide a method for the fabrication of thermometer bulbs which overcomes the disadvantages of the prior art.

It is another object of this invention to provide such a method whereby a clinical thermometer bulb is formed integrally with the thermometer stem.

It is still another object of the present invention to provide such a method whereby thermometer bulbs of increased strength and minimal size variations are produced.

It is a further object of this invention to provide an apparatus for the fabrication of thermometer bulbs.

These and other objects of the present invention will become more fully apparent by reference to the following detailed description when read in conjunction with the accompanying drawing wherein:

FIGURE 1 is a diagrammatic elevation of an apparatus for fabricating thermometer bulbs according to the present invention;

FIGURE 2 shows a thermometer tube after a preforming step in one process of the present invention;

FIGURE 3 shows the thermometer tube of FIGURE 2 being subjected to a subsequent bulb-forming operation; and FIGURES 4 and 5 show the formation of thermometer bulbs of varied sizes and shapes.

Referring now to the drawings more in detil, FIGURE 1 shows an apparatus for forming a thermometer bulb according to the present invention. A thermometer stem 10 is mounted in rotary holder 12 which is rotated in the direction of the arrow by a source of power not shown. Gas under pressure is introduced through line 14 into bore 16 of stem 10 through a suitable fitting 18. Mounted above rotary holder 12 is a rod member 20 which carries at one end thereof a pivotally mouned lever 22 which pivots about pin 24. One end of lever 22 has mounted thereon a rotatable die element 26. The other end of lever 22 carries a vernier adjustment mechanism, generally 30. Mechanism 30 comprises a set screw 32 mounted in lever 22. Set screw 32 carries lock nut 34 which abuts lever 22 on one side thereof and movable weights 36 on the other side of lever 22. Rod member 20 is placed such that die element 26 is adjacent to end 10' of thermometer tube 10 and weights 36 are movable to carefully adjust the amount of pressure which is applied to thermometer tube end 10' through die element 26. Rod member 20 is also provided with stop member 38 to prevent accidental or excessive displacement of lever 22.

In one preferred method in forming a thermometer bulb according to the present invention, thermometer tube 10 is mounted in holder 12 and tube end 10' is heated to the softening point, for example by a suitable burner not shown. Generally, thermometer tube glass will soften to a point sufficient to seal the end of the tube by heating the glass to a temperature between 1200° and 1500° F. Holder 12 and tube 10 mounted therein are now rotated at a speed between about 40 and 70 r.p.m. and gas at a pressure between 20 and 25 p.s.i. is fed into bore 16. The gas may be air or nitrogen. Pressure in bore 16 gradually rises sufficiently high to form an enlargement at end 10' of tube 10. As end 10' of tube 10 gradually enlarges, it comes into contact with die element 26 which, because of the pressure exerted therethrough by weights 36, causes the enlargement to be formed into a bulb 40 corresponding to the shape of the die element. Generally, a pressure between about 1/16 and 1 p.s.i. is sufficient and will vary as is understood, depending upon the particular temperature and pressure used and upon the size of the thermometer tube. Thermometer bulbs have been made successfully within the ranges of operating conditions noted above. It is also to be understood that after formation of the integral bulb, the thermometer tube may be filled with an indicating liquid, calibrated and sealed at the end opposite the bulb in a manner well known in the art to form a completed thermometer.

In the clinical thermometer field, thermometer bulbs are of three general types. The first is a relatively long and cylindrically shaped bulb known as the oral type, as shown in FIGURES 2 and 3. The second is pear shaped and known as the rectal type (FIGURE 5) and the third is a short cylindrical bulb known as the security or stubby type, shown in FIGURE 4, which may be used either as an oral or rectal thermometer. The security or stubby bulbs and the rectal bulbs are formed according to the foregoing description through the use of dies shaped as in FIGURES 4 and 5. Through the use of heat and the die element, the appropriate size to contain the correct amount of mercury for the desired scale is obtained.

In the formation of an oral thermometer, as shown in FIGURES 2 and 3, however, a preforming step is preferable. The stem glass is initially heated in the area where the bulb will be formed and a very small blister is blown in the heated area. The stem glass is then stretched or elongated to form a portion of reduced diameter. The preformed tube is then separated from the remainder of the stem glass and the elongated portion is sealed. These steps may be performed simultaneously by use of a gas cutting jet. The preformed tube 10 is then placed in holder 12. Bulb 40 is then formed by a combination of heat, gas pressure from within and the use of die elements 26.

Each of the thermometer tubes shown in the figures is of the self-registering type having been preformed with restrictions 42 therein and carrying a reflecting face 44 on one side thereof (see FIGURE 4).

Thermometers fabricated according to the foregoing method fulfill the objects of this invention. The thermometer bulbs are formed integrally with the stems thereof and exhibit increased strength and regularity of size and shape over those produced by prior art methods.

In the case of clinical thermometers, in addition to the foregoing advantages, there is the distinction that thermometers produced by the method of the present invention are easily identifiable. This is due to the strip of white or colored reflecting surface on the stem glass which will also appear on one side of the bulb since the bulb is formed from the stem glass and is integral therewith.

While preferred embodiments of the invention are hereinbefore set forth, it is to be clearly understood that the invention is not to be limited to the exact steps and methods illustrated and described, because various modifications of these details may be provided in putting the invention into practice within the purview of the appended claims.

What is claimed is:
1. A method of forming thermometer having a thermometer bulb unitary with a thermometer stem which comprises; sealing one end of a capillary thermometer tube by heating the same to the softening point thereof, rotating said heated and sealed tube so that the capillary in said tube is maintained substantially intact, introducing a gas under pressure into the capillary of said rotating tube through the unsealed end thereof in amounts sufficient to expand said sealed end thereby providing the thermometer bulb unitary with the thermometer stem, contacting said heated and expanded sealed end, while continuing rotating said tube and introducing gas thereto, with a bulb shaping surface and urging said contacting surface into pressure engagement with said sealed end of said tube thereby shaping said thermometer bulb.

2. The method according to claim 1 wherein said contacting surface is urged into engagement with said sealed end under a pressure ranging between $1/16$ and 1 p.s.i.

3. The method of claim 1 wherein prior to sealing one end of a capillary thermometer tube, said tube is heated and drawn to form a portion of reduced diameter.

4. The method according to claim 1 wherein said one end is heated to a temperature between 1200° and 1500° F.

5. The method according to claim 1 wherein the tube is rotated at a speed between 40 and 70 r.p.m.

6. The method according to claim 1 wherein the gas is fed at a pressure between 20 and 25 p.s.i.

7. The method according to claim 1 wherein the gas is selected from the group consisting of air and nitrogen.

References Cited by the Examiner

UNITED STATES PATENTS

| | | | |
|---|---|---|---|
| 1,692,381 | 11/1928 | Norwood | 73—371 |
| 1,906,315 | 5/1933 | Davis et al. | 65—109 X |
| 2,306,995 | 12/1942 | Palmer et al. | 65—105 |
| 2,931,735 | 4/1960 | Richards. | |
| 2,990,648 | 7/1961 | Chaney | 65—261 |

S. LEON BASHORE, *Primary Examiner.*

DONALL H. SYLVESTER, *Examiner.*

A. D. KELLOGG, *Assistant Examiner.*